United States Patent Office 2,947,778

Patented Aug. 2, 1960

2,947,778

1,12-DIMETHYL-6-HYDROXY - 7 - AROYL - 1,2,3,4,9, 10,11,12 - OCTAHYDROPHENANTHRENE-1-CARBOXYLIC ACIDS, ETHERS AND ESTERS THEREOF

Roy H. Bible, Jr., Morton Grove, Ill., assignor to G. D. Searle & Co., Chicago, Ill., a corporation of Delaware No Drawing. Filed Sept. 23, 1958, Ser. No. 762,683

10 Claims. (Cl. 260—468.5)

The present invention relates to polyhydrophenanthrene compounds, and is specifically concerned with 1,12 - dimethyl - 6 - hydroxy - 7 - aroyl - 1,2,3,4,9,10,11, 12-octahydrophenanthrene-1-carboxylic acids, ethers and esters thereof. The compounds of the present invention can be represented by the structural formula

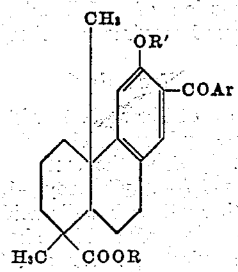

wherein R and R′ can represent hydrogen or a lower alkyl radical, and wherein Ar represents a monocyclic aromatic radical containing fewer than 9 carbon atoms.

The lower alkyl radicals which R and R′ can represent can be selected from among such radicals as methyl, ethyl, propyl, butyl, amyl, hexyl, heptyl, octyl, and branched-chain isomers thereof.

The term Ar in the foregoing structural formula is an aromatic radical containing fewer than 9 carbon atoms. It can represent an aromatic hydrocarbon radical such as phenyl, methylphenyl, dimethylphenyl or ethylphenyl. It can also represent an aromatic halohydrocarbon radical such as chlorophenyl, bromophenyl, iodophenyl, dichlorophenyl, tribromophenyl, and similarly halogenated methylphenyl, dimethylphenyl, and ethylphenyl radicals. In addition, it can represent an alkoxyhydrocarbon radical such as methoxyphenyl, dimethoxyphenyl, ethoxyphenyl, and methoxymethylphenyl, a common feature of the foregoing aromatic radicals being that they contain fewer than 9 carbon atoms.

The compounds of the present invention can be manufactured from such readily available resin acid derivatives as methyl O-methylpodocarpate and ethyl O-ethylpodocarpate. Illustrative of a general method of operation, an alkyl O-alkylpodocarpate of the structural formula

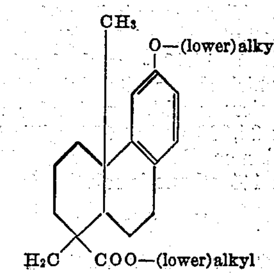

is subjected to an aluminum chloride-catalyzed condensation with an aroyl chloride of the structural formula Ar—CO—Cl Ar being defined as hereinbefore.

Upon treatment of the resulting alkyl ester of 1,12-dimethyl - 6 - alkoxy - 7 - aroyl - 1,2,3,4,9,10,11,12 - octahydrophenanthrene-1-carboxylic acid with pyridine hydrochloride as set forth in detail hereinafter, there occurs cleavage of the ether and ester groups with the formation of a 1,12-dimethyl-6-hydroxy-7-aroyl-1,2,3,4,9,10,11, 12-octahydrophenanthrene-1-carboxylic acid. Selective hydrolysis of the 6-alkoxy or the 1-alkoxycarbonyl group can also be achieved. By treatment of a chlorobenzene solution with aluminum chloride the ether function is preferentially hydrolyzed, whereas refluxing with morpholine followed by dilution with water causes preferential hydrolysis of the ester function.

The compounds of the present invention have valuable pharmacological properties. They are anti-inflammatory agents and they are effective in the treatment of inflammation of the iris. They have a phenylbutazone-like effect on local edema, particularly foot edema. They have an estrogen-like effect on the cholesterol/phospholipid ratio in the serum. They also have anti-bacterial properties, exhibited, for example, against *B. subtilis* and *E. coli*. Also they are effective as selective shields of ultraviolet radiation.

This invention will appear more fully from the examples which follow. These examples are set forth by way of illustration only, and it will be understood that the invention is not to be construed as limited in spirit or in scope by the details contained therein, as many modifications in materials and methods will be apparent from this disclosure to those skilled in the art. In these examples temperatures are given in degrees centigrade (° C.) and quantities of materials in parts by weight.

The present application is a continuation-in-part of the copending application Serial No. 598,764, filed July 19, 1956, on which U.S. Patent 2,854,474 has issued on September 30, 1958.

*Example 1*

To a stirred mixture of 83 parts of methyl O-methylpodocarpate and 450 parts of chlorobenzene, maintained at about 10–15° C., there is added a total of 75 parts of aluminum chloride in several portions over a 10 minute period. There is then added over a 30 minute period a solution of 42 parts of benzoyl chloride in 40 parts of chlorobenzene. The mixture is allowed to warm to room temperature gradually and is then allowed to stand at about 25° C. for 18 hours, after which it is poured into several times its volume of ice water which has been acidified with hydrochloric acid. The resulting mixture is distilled under reduced pressure until almost all of the chlorobenzene is removed, after which it is extracted with several portions of ether. The combined ether extract is washed with 10% hydrochloric acid, with water, with 10% sodium hydroxide solution, and finally with several portions of water, after which it is concentrated to dryness. By several crystallizations of the non-volatile residue from aqueous acetic acid and then from aqueous methanol there is obtained the methyl ester of 1,12-dimethyl - 6 - methoxy - 7 - benzoyl - 1,2,3,4,9,10,11,12-octahydrophenanthrene-1-carboxylic acid which melts at about 114–119° C. and has the structural formula

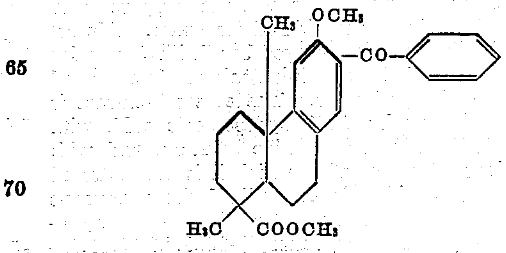

*Example 2*

To a stirred mixture of 30 parts of methyl O-methylpodocarpate in 110 parts of chlorobenzene maintained at about 10–15° C. there is added 27 parts of aluminum chloride over a 10 minute period followed by a solution of 35 parts of p-chlorobenzoyl chloride in 15 parts of chlorobenzene over a 30 minute period. The mixture is allowed to warm gradually to room temperature and then to stand for about 18 hours, after which it is poured into several times its volume of acidified ice water. Most of the chlorobenzene is removed by distillation under reduced pressure, and the remaining mixture is extracted with several portions of ether. The combined ethereal extract is washed with 10% hydrochloric acid, with water, with 10% sodium hydroxide solution, and with several portions of water, and is then concentrated to dryness. By two crystallizations of the non-volatile residue from mixtures of ethyl acetate and petroleum ether there is obtained the methyl ester of 1,12-dimethyl-6-methoxy-7-(p-chlorobenzoyl)-1,2,3,4,9,10,11,12-octahydrophenanthrene-1-carboxylic acid which melts at about 140–144° C. and has the structural formula

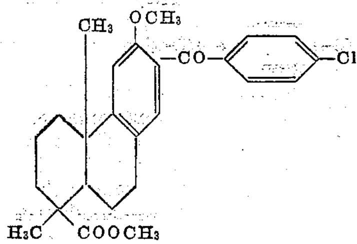

*Example 3*

Substitution of 62 parts of 2,5-dibromo-4-methylbenzoyl chloride for the p-chlorobenzoyl chloride in the procedure of the preceding example yields the methyl ester of 1,12-dimethyl-6-methoxy-7-(2,5-dibromo-4-methylbenzoyl)-1,2,3,4,9,10,11,12-octahydrophenanthrene-1-carboxylic acid of the structural formula

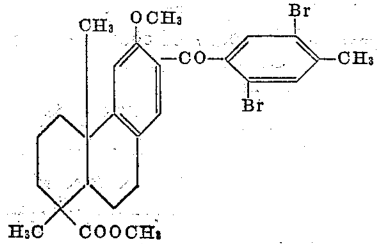

The specific rotation of a 1% ethanolic solution is 76°. Infrared absorption maxima are observed at 5.80 and 6.03 microns.

*Example 4*

To a stirred mixture of 30 parts of methyl O-methylpodocarpate and 110 parts of chlorobenzene maintained at 10–15° C. there is added 27 parts of aluminum chloride over a 10 minute period followed by a solution of 34 parts of o-methoxybenzoyl chloride and 15 parts of chlorobenzene over a 30 minute period. Stirring is continued for 3 hours while the mixture is gradually allowed to warm to room temperature. It is then maintained at about 25° C. for 18 hours, after which it is poured into several times its volume of acidified ice water. Almost all of the chlorobenzene is removed by distillation under reduced pressure, and the remaining mixture is extracted with several portions of ether. The ethereal extract is washed successively with 10% hydrochloric acid, with water, with 10% sodium hydroxide solution, and with several portions of water, after which it is concentrated to dryness. The residue is crystallized from aqueous methanol to afford the methyl ester of 1,12-dimethyl-6-methoxy-7-(o-methoxybenzoyl)-1,2,3,4,9,10,11,12-octahydrophenanthrene-1-carboxylic acid melting at about 118–121° C. The structural formula is

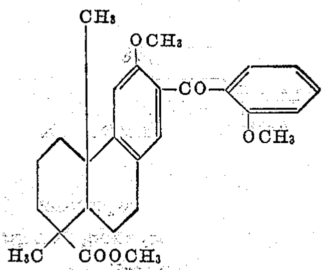

*Example 5*

By the substitution of 36 parts of p-ethoxybenzoyl chloride for the o-methoxybenzoyl chloride in the procedure of the preceding example there is obtained the methyl ester of 1,12-dimethyl-6-methoxy-7-(p-ethoxybenzoyl)-1,2,3,4,9,10,11,12-octahydrophenanthrene-1-carboxylic acid.

The specific rotation of a 1% ethanolic solution is $[\alpha]_D=98°$. Infrared maxima are observed at 5.81 and 5.98 microns.

*Example 6*

By the procedure of Example 1, with the substitution of 50 parts of o-ethylbenzoyl chloride for the benzoyl chloride, there is obtained the methyl ester of 1,12-dimethyl-6-methoxy-7-(o-ethylbenzoyl)-1,2,3,4,9,10,11,12-octahydrophenanthrene-1-carboxylic acid.

The specific rotation of a 1% ethanolic solution is 102°. Infrared maxima are seen at 5.83 and 6.07 microns. The ultraviolet spectrum shows maxima at 250 and 320 millimicrons with molecular extinction coefficients of about 24,000 and 3,400 respectively.

*Example 7*

Diethyl sulfate (46.2 parts) is added, with stirring, to a solution of 27.4 parts of podocarpic acid and 12.8 parts of sodium hydroxide in 50% aqueous ethanol, and the resulting mixture is boiled for 5 minutes and allowed to cool. The precipitated ethyl O-ethylpodocarpate is collected on a filter and washed with dilute sodium carbonate solution and with water. The ethyl O-ethylpodocarpate is dried thoroughly in a vacuum desiccator. A solution prepared from 19.7 parts of this product and 17.5 parts of benzoyl chloride in 250 parts of nitrobenzene is cooled to 0° C. and treated with 16.2 parts of aluminum chloride added in several portions over a period of 1 hour. The mixture is stirred at 0° C. for an additional 3 hours, and then allowed to stand at 0–5° C. for 100 hours and finally at about 20° C. for 5 hours. The mixture is then stirred with ice and dilute hydrochloric acid. The nitrobenzene phase is separated, washed with several portions of water, and distilled with steam until the organic solvent is removed. The remaining aqueous suspension is extracted with ethyl acetate, and the ethyl acetate solution is washed with water and concentrated to dryness under reduced pressure. The non-volatile residue consists substantially of the ethyl ester of 1,12-dimethyl-6-ethoxy-7-benzoyl-1,2,3,4,9,10,11,12-octahydrophenanthrene-1-carboxylic acid which shows ultraviolet absorption maxima at 250 millimicrons with a molecular extinction coefficient of about 24,000 and at 320 millimicrons with a molecular extinction coefficient of about 3,400. The specific rotation of a 1% ethanolic solution is 103°.

*Example 8*

A solution of 2 parts of the methyl ester of 1,12-dimethyl-6-methoxy-7-benzoyl-1,2,3,4,9,10,11,12-octahydrophenanthrene-1-carboxylic acid in 40 parts of pyridine hydrochloride is heated under reflux for 40 minutes and is then poured into about 300 parts of water with stirring. The insoluble product is collected on a filter and washed with hot water. Recrystallization from methanol yields 1,12 - dimethyl - 6 - hydroxy - 7 - benzoyl-1,2,3,4,9,10,11,12 - octahydrophenanthrene - 1 - carboxylic acid which shows infrared maxima at 5.93 and 6.15 microns. This compound exhibits ultraviolet absorption maxima at 255 (shoulder), 277 and 350 millimicrons.

*Example 9*

A mixture of 12.2 parts of the methyl ester of 1,12-dimethyl - 6 - methoxy - 7 - benzoyl - 1,2,3,4,9,10,11,12-octahydrophenanthrene - 1 - carboxylic acid, 2.82 parts of phenol and 26 parts of morpholine is heated at reflux for 18 hours. The resulting solution is then cooled and diluted with 400 parts of water. The reaction mixture is extracted with ether and the extract is washed with 10% aqueous hydrogen chloride solution until the washings are acidic. The extract is then washed with water to neutrality. On addition of 200 parts of a 5% aqueous solution of sodium carbonate a precipitate forms which is dissolved in a large amount of water. The solution of the sodium salt of 1,12 - dimethyl - 6 - methoxy - 7 - benzoyl - 1,2,3,4,9,10,11,12 - octahydrophenanthrene - 1 - carboxylic acid is filtered. On acidification of the filtrate the free acid is obtained which, on two recrystallizations from aqueous methanol, is obtained in crystals melting at about 213–216° C.

*Example 10*

To a stirred mixture of 8 parts of aluminum chloride in 110 parts of chlorobenzene there is added a solution of 10 parts of the methyl ester of 1,12 - dimethyl - 6-methoxy - 7 - benzoyl - 1,2,3,4,9,10,11,12 - octahydrophenanthrene - 1 - carboxylic acid in 55 parts of chlorobenzene. Stirring is continued and the mixture is maintained at about 80° C. for an additional hour, after which it is cooled and poured into ice water. Dilute hydrochloric acid and benzene washings of the reaction vessel are added, and the organic solvents are removed by distillation under reduced pressure. The product remaining is then separated and washed by decantation with several portions of water. Purification by recrystallization from aqueous acetic acid yields the methyl ester of 1,12 - dimethyl - 6 - hydroxy - 7 - benzoyl - 1,2,3,4,9,10,11,12-octahydrophenanthrene - 1 - carboxylic acid melting at about 207–211° C.

What is claimed is:

1. A compound of the structural formula

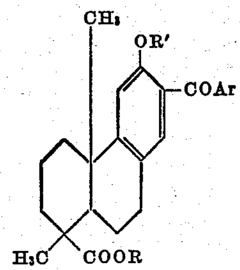

wherein R and R' are members of the group consisting of hydrogen and lower alkyl radicals; and wherein Ar is a monocyclic aromatic hydrocarbon radical containing fewer than 9 carbon atoms, monocyclic aromatic halohydrocarbon radical containing fewer than 9 carbon atoms, and monocyclic aromatic alkoxyhydrocarbon radical containing fewer than 9 carbon atoms.

2. A compound of the structural formula

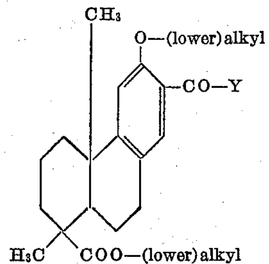

wherein Y is a monocyclic aromatic hydrocarbon radical containing fewer than 9 carbon atoms.

3. Methyl ester of 1,12 - dimethyl - 6 - methoxy - 7-benzoyl - 1,2,3,4,9,10,11,12 - octahydrophenanthrene - 1-carboxylic acid.

4. A compound of the structural formula

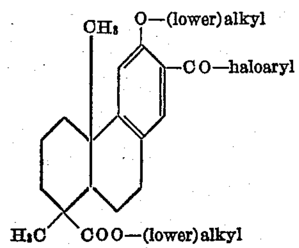

wherein the haloaryl radical is a monocyclic aromatic halohydrocarbon radical containing fewer than 9 carbon atoms.

5. Methyl ester of 1,12 - dimethyl - 6 - methoxy - 7-(p - chlorobenzoyl) - 1,2,3,4,9,10,11,12 - octahydrophenanthrene - 1 - carboxylic acid.

6. A compound of the structural formula

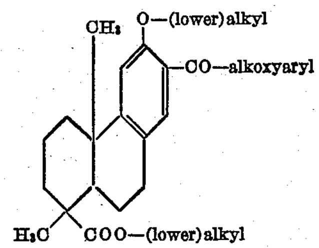

wherein the alkoxyaryl radical is a monocyclic aromatic alkoxyhydrocarbon radical containing fewer than 9 carbon atoms.

7. Methyl ester of 1,12 - dimethyl - 6 - methoxy - 7 -(o-methoxybenzoyl) - 1,2,3,4,9,10,11,12 - octahydrophenanthrene - 1 - carboxylic acid.

8. Lower alkyl ester of 1,12 - dimethyl - 6 - hydroxy-7 - benzoyl - 1,2,3,4,9,10,11,12 - octahydrophenanthrene-1 - carboxylic acid.

9. 1,12 - dimethyl - 6 - methoxy - 7 - benzoyl - 1,2,3,4,-9,10,11,12 - octahydrophenanthrene - 1 - carboxylic acid.

10. 1,12 - dimethyl - 6 - hydroxy - 7 - benzoyl - 1,2,3,4,-9,10,11,12 - octahydrophenanthrene - 1 - carboxylic acid.

References Cited in the file of this patent

UNITED STATES PATENTS

| | | |
|---|---|---|
| 2,750,373 | Bible | June 12, 1956 |
| 2,767,162 | Picha | Oct. 16, 1956 |
| 2,851,485 | Bible | Sept. 9, 1958 |
| 2,854,474 | Bible | Sept. 30, 1958 |